United States Patent [19]
Lin

[11] Patent Number: 5,467,228
[45] Date of Patent: Nov. 14, 1995

[54] LIGHT CONTROL DEVICE

[75] Inventor: James Lin, Taipei Hsien, Taiwan

[73] Assignee: Taiwan Line Tek Electronic Co., Ltd., Taipei Hsien, Taiwan

[21] Appl. No.: 260,733

[22] Filed: Jun. 15, 1994

[51] Int. Cl.⁶ .................................................. G02B 7/02
[52] U.S. Cl. ........................... 359/822; 359/896; 250/234; 250/239; 362/458
[58] Field of Search .................................. 362/259, 276, 362/802, 800, 458; 136/243, 246, 259, 291; 250/234, 239, 237 R; 359/362, 367, 385, 390, 819, 822, 829, 896; 385/49, 88, 90

[56] References Cited

U.S. PATENT DOCUMENTS

| | | | |
|---|---|---|---|
| 2,762,932 | 9/1956 | Falge et al. | 250/237 R |
| 2,912,593 | 11/1959 | Deuth | 250/239 |
| 3,653,021 | 3/1972 | Litman et al. | 250/239 |
| 3,679,906 | 7/1972 | Myers | 250/239 |
| 3,984,846 | 10/1976 | Gallagher et al. | 250/234 |
| 4,088,396 | 5/1978 | Edelstein | 359/822 |
| 4,568,827 | 2/1986 | Walter | 250/239 |
| 5,258,899 | 11/1993 | Chen | 362/802 |

Primary Examiner—Ira S. Lazarus
Assistant Examiner—Alan B. Cariaso
Attorney, Agent, or Firm—Bacon & Thomas

[57] ABSTRACT

A photosensitive element is adjustably mounted on a device, including a base frame having a flat base and a ball socket perpendicularly extended from the flat base and defining a half-round recess, the flat base having a center through hole through the center of the half-round recess for the insertion of a photosensitive element being connected to a light source through an electric wire, a core member, which has a ball head at one end received and turned within the half-round recess, an outer thread at an opposite end, a longitudinal through hole aligned with the center through hole on the base frame, and a lens mounted within the longitudinal through hole, and a socket shell, which has an inner thread at one end threaded onto the outer thread of the core member, a longitudinal through hole aligned with the longitudinal through hole on the core member, and a lens set mounted within the longitudinal through hole and matched with the lens on the core member.

3 Claims, 2 Drawing Sheets

LIGHT CONTROL DEVICE

BACKGROUND OF THE INVENTION

The present invention relates generally to a light control device and more particularly to a device for mounting a photosensitive element—prior to 'which'; which can be conveniently adjusted to change the focus of the lenses and the detecting direction of the photosensitive element.

A regular auto-switching control device for controlling the operation of a fluorescent lamp is generally comprised of a photosensitive element (for example, a photoresistance) for detecting the intensity of light, and a switch connected to the photosensitive element and controlled by the photosensitive element to turn on/off a fluorescent lamp. This structure of auto-switching device has been extensively used for controlling door lamps, yard lamps, desk lamps, etc.

It is known that the sensitivity of a photosensitive element is governed by the area of the photosensitive surface on the photosensitive element and the distance of the photosensitive element from the light source. Because the detecting distance of convention auto-switching control devices is not adjustable, the installation position of such devices cannot be changed freely. For example, when the photosensitive device is installed near a window it may detect strong light and keep the lamp turned off while the intensity of light inside the house is at a low level. On the contrary, if the photosensitive device is installed inside the room, it will automatically turn on the lamp when a light intensity around the photosensitive device is at a low level while the light intensity area near by the window is still strong.

SUMMARY OF THE INVENTION

The present invention has been accomplished to provide a device for adjustably mounting a photosensitive element which eliminates the aforesaid problem. According to the present invention, the device comprises a base frame having a ball socket, a core member connected to the ball socket of the base frame through a ball and socket joint to hold a lens, a photosensitive element received within a longitudinal hole on the core member, and a socket shell fastened to the core member through a screw joint to hold a lens set. Because the core member is fastened to the base frame through a ball and socket joint, the core member can be moved to change the detecting angle of the photosensitive element. Because the socket shell is fastened to the core member, the socket shell can be turned inwards or outwards relative to the core member to adjust the focus of the lenses.

DETAILED DESCRIPTION OF THE PREFERRED EMBODIMENT

Figure 1:
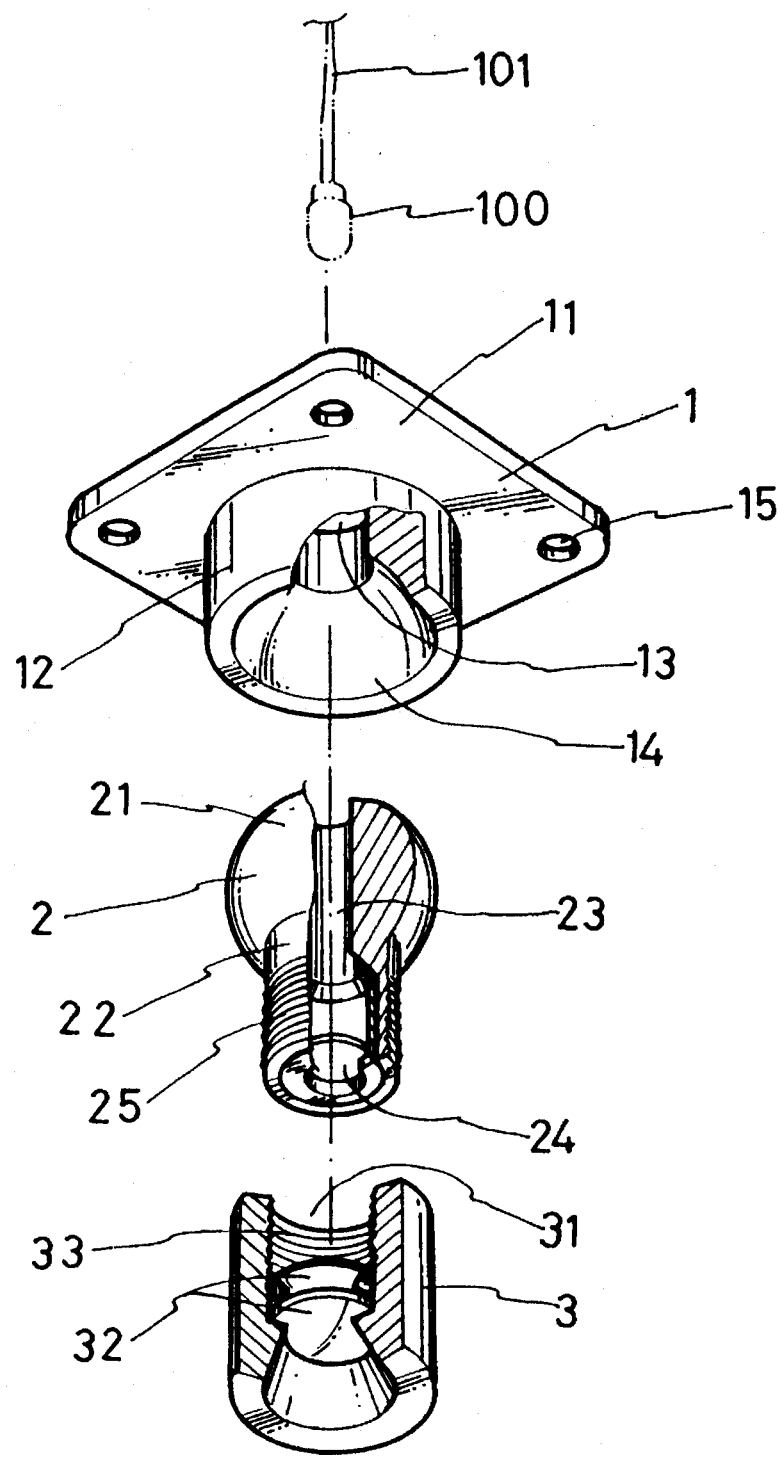
FIG. 1 is an exploded view in cutaway of a light control device according to the present invention.
Figure 2:
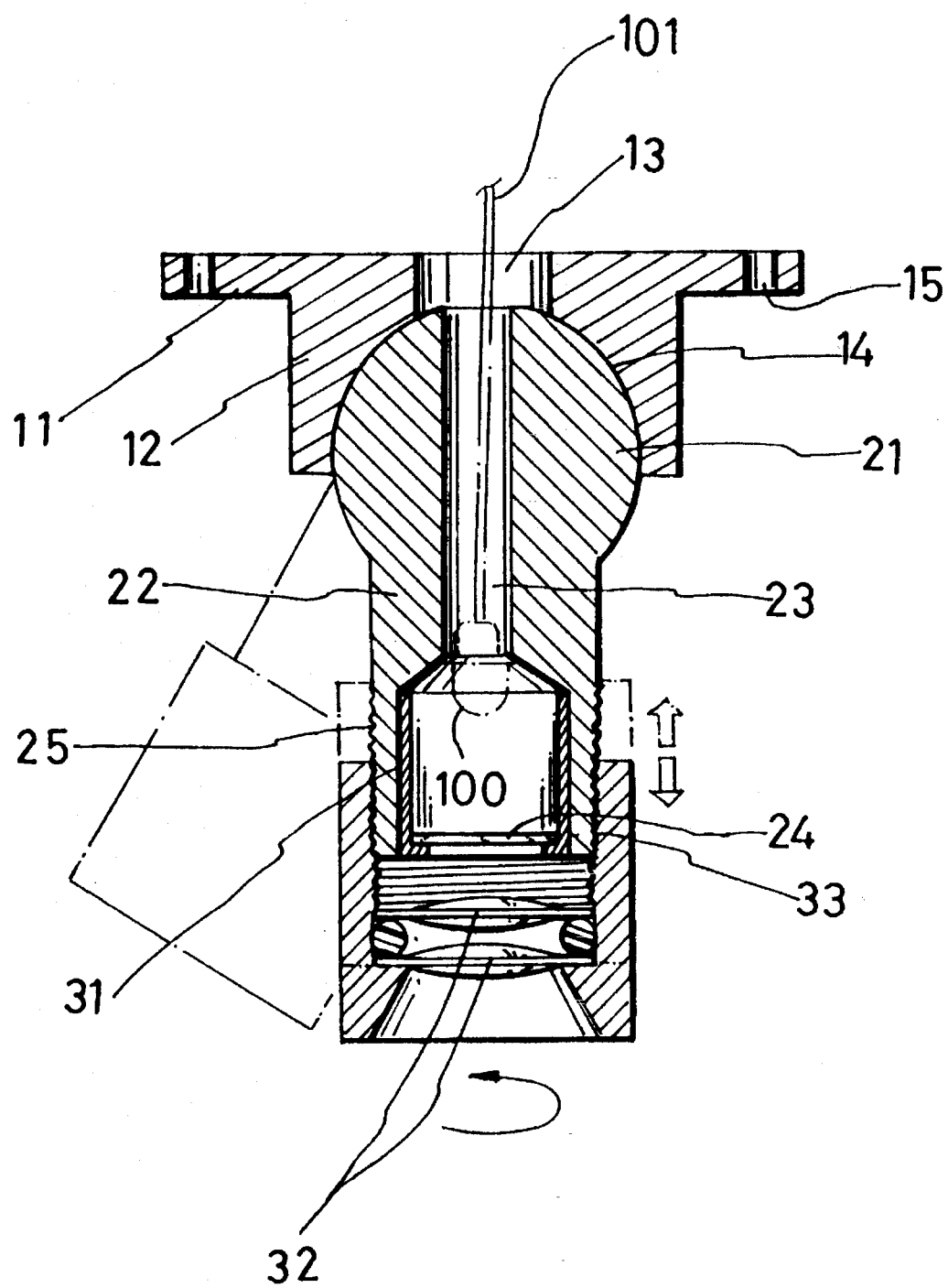
FIG. 2 is an assembly view in section of the light control device shown in FIG. 1.

Referring to FIGS. 1 and 2, a light control device according to the present invention is generally comprised of a base frame 1, a core member 2, and a socket shell 3. The base frame 1 is made in integral from and includes a flat base 11 and a ball socket 12 perpendicularly extended from the flat base 11 and defining a half-round recess 14. The flat base 11 has mounting holes 15 spaced around the border for mounting on the wall, ceiling, etc., by screws, and a center through hole 13 through the center of the half-round recess 14. The center through hole 13 is provided for the insertion of a photosensitive element 100 and an electric wire 101. The half-round recess 14 is flexible. The core member 2 is made in integral form and includes hollow shaft 22 having a top end terminating in a ball head 21 and a bottom end terminating in an outer thread 25. A longitudinal through hole 23 is made on the core member 2 through the ball head 21, the shaft 22 and the outer thread 25. A lens 24 is mounted within the longitudinal through hole 23 at the bottom. The outer diameter of the ball head 21 is slightly shorter than the arc length of the half-round recess 14, and therefore the ball head 21 can be received and turned within the half-round recess 14 of the ball socket 12. The socket shell 3 is made of cylindrical shape having a longitudinal through hole 31, a lens set 32 mounted within the longitudinal through hole 31, and an inner thread 33 on the top end of the longitudinal through hole 31. By threading the inner thread 33 with the outer thread 25, the socket shell 3 is fastened to the shaft 22 of the core member 2.

Referring to FIG. 2 again, a photosensitive element (100) is mounted within the hollow shaft 22 to detect light. The electric wire 101 of the photosensitive element is extended out of the longitudinal through hole 23 on the core member 2 and the center through hole 13 on the base frame 1 and then connected to a light source. The lens 24 on the core member 2 and the lens set 32 on the socket shell 3 are longitudinally aligned and matched to increase the sensitivity of the detection of the photosensitive element 100. By turning the socket shell 3 relative to the core member 2, the focus of the lenses 24 and 32 is adjusted. By turning the ball head 21 within the half-round recess 14, the detecting direction of the photosensitive element 100 is adjusted.

As indicated above, the light intensity control device can be conveniently adjusted to change the focus of the lenses and the detecting direction of the photosensitive element 100.

While only one embodiment of the present invention has been shown and described, it will be understood that various modifications and changes could be made without departing from the spirit and scope of the invention.

What is claimed is:

1. A device for adjustably mounting a photosensitive element comprising:
   a) a base frame including a flat base and a ball socket extending perpendicularly from the flat base and defining a half-round recess, and a center hole extending through the flat base and ball socket;
   b) an elongate core member including a ball head pivotally mounted within the ball socket and an outer threaded portion, a longitudinal passage extending through the ball head and outer threaded portion, and a first lens mounted within the longitudinal passage;
   c) the center hole and longitudinal passage being disposed in alignment for receiving a photosensitive element and wire assembly therethrough;

d) a socket shell including an inner thread engaged on the outer threaded portion of the core member, a longitudinal hole aligned with the longitudinal passage of the core member, and a second lens mounted within the longitudinal hole of the socket shell; and e) whereby the focus of the first and second lenses may be adjusted by rotating the socket shell relative to the core member to increase or decrease the distance between the first and second lenses, and the detecting direction of the photosensitive element may be adjusted by pivoting the core member relative to the base frame.

2. The device of claim 1 wherein the outer diameter of the ball head is less than the arc length of the half-round recess.

3. The device of claim 1 wherein the second lens includes a plurality of separate lenses.

* * * * *